United States Patent [19]

Viravec et al.

[11] 4,202,369
[45] May 13, 1980

[54] GAS RELIEF VALVE DESIGN FOR LOW TEMPERATURE

[75] Inventors: Joseph T. Viravec, Renton; Maurice A. Hoyt, Redmond, both of Wash.

[73] Assignee: The United States of America as represented by the Secretary of the Air Force, Washington, D.C.

[21] Appl. No.: 916,024

[22] Filed: Jun. 15, 1978

[51] Int. Cl.² ............................................. F16K 31/12
[52] U.S. Cl. .................................. 137/508; 137/469; 137/513.5
[58] Field of Search ............ 137/513.5, 469, 474, 137/508

[56] References Cited

U.S. PATENT DOCUMENTS

| | | | |
|---|---|---|---|
| 2,845,945 | 8/1958 | Mancusi | 137/469 |
| 2,917,072 | 12/1959 | Saville | 137/469 |
| 2,931,385 | 4/1960 | Carlisle et al. | |
| 3,050,078 | 8/1962 | Hooper | 137/508 X |
| 3,272,218 | 9/1963 | Johnson | |
| 3,431,028 | 3/1969 | Yoder | 137/513.5 X |

*Primary Examiner*—Harold W. Weakley
*Attorney, Agent, or Firm*—Joseph E. Rusz; Arsen Tashjian

[57] ABSTRACT

A relief valve is provided with slots across the end of the valve stem where contact is made with the valve body to eliminate gas pressurization in the annular area bounded by circumferential contact between the valve stem and the body and a smaller diameter circumferential contact between valve seat/seal members. This construction prevents any leakage gas from becoming trapped between the valve stem and the container which would lower the design cracking pressure thereby adversely affecting the operation of the relief valve.

1 Claim, 4 Drawing Figures

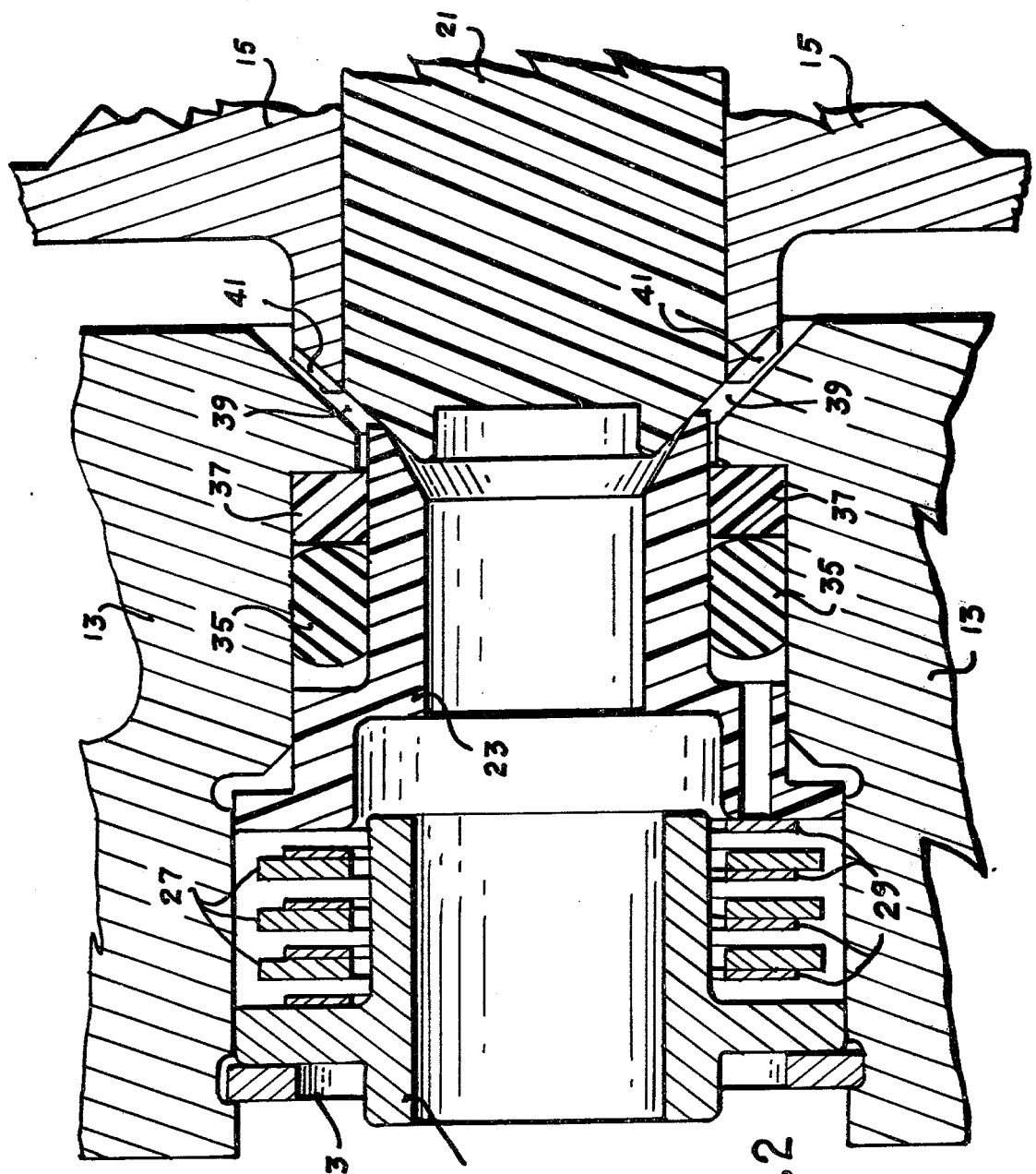

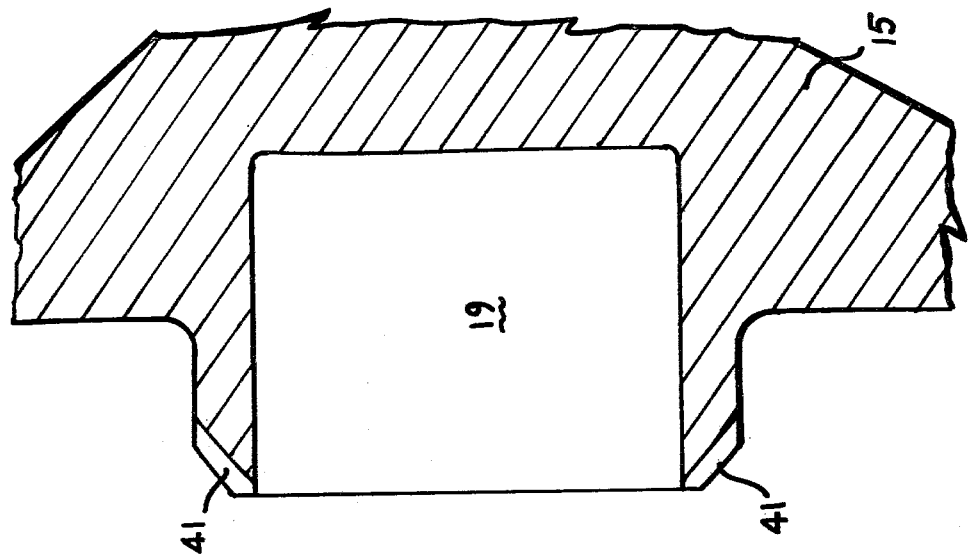
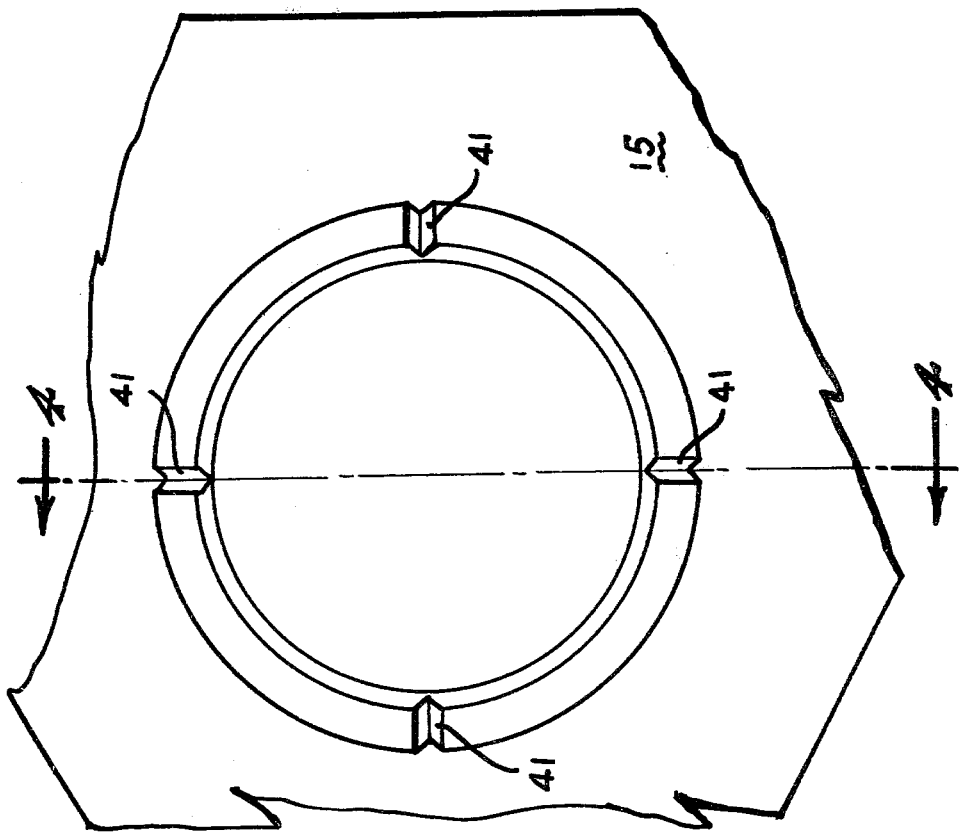

GAS RELIEF VALVE DESIGN FOR LOW TEMPERATURE

STATEMENT OF GOVERNMENT INTEREST

The invention described herein may be manufactured and used by or for the Government for governmental purposes without the payment of any royalty thereon.

BACKGROUND OF THE INVENTION

This invention relates to gas relief valve designs and, more particularly, the invention is concerned with providing a gas relief valve design especially suitable for operation at cryogenic temperatures (−65° F.) and contact forces where gas leakage would adversely affect the opening threshold pressure of the relief valve.

Heretofore, the operation of a gas relief valve subjected to high pressurization rates in a low temperature (−65° F.) environment was generally erratic. Attempts to solve this problem were directed towards tighter dimensional tolerances and material revisions in the relief valve seal area. These attempts were not successful in eliminating erratic and unacceptable leakage at −65° F. during the rapid pressurization of the valve.

The original configuration of the valve was inconsistent in operation at the −65° F. environment. During activation of the valve, high pressure helium gas (3700–6000 psig) is discharged from a storage bottle into the container in which the relief valve is mounted. At the −65° F. temperature using the original valve configuration, excessive amounts of gas were lost through the valve during the initiation transient (when the valve should have remained in the closed condition) with inadequate system pressures resulting. This problem resulted from gas leaking past the seat O-ring during initial pressurization of the O-ring at −65° F. This is a common occurrence during low temperature sealing of gas. It is caused by thermal effects on the O-ring elastomer and lubricant, as well as distortion of the O-ring from its relaxed (unpressurized) condition to its final position against the downstream edge of the O-ring groove under full pressure load. This gas was trapped in the annulus formed by the metal-to-metal contact of the valve stem and container.

During normal operation, the contact force between the valve seat and the seal is provided by two sources: the wave spring force and a pressure-generated force. The pressure-generated force arises from a small circular area on the seat that is not subjected to inlet gas pressure. The remaining surface of the seat is pressure-balanced and does not produce any contribution to seat/seal contact forces. The seat/seal contact forces are approximately 3 lbs, and up to 30 lbs for the wave spring and pressure-generated forces, respectively. Any leakage gas trapped between the stem and container reduces the pressure-generated seat/seal contact force. When the seat/seal contact force is reduced sufficiently, gas can then flow by the seat/seal interface to increase the pressure on the end of the stem in contact with the container. This area is greater that the area of the valve seal with the result that the valve opens at less than ⅔ of the design cracking pressure. The hereinafter described invention will alleviate this problem and provide a tight seal which prevents the escape of helium gas during pressurization at −65° F.

SUMMARY OF THE INVENTION

The present invention is concerned with providing a gas relief valve design for low temperature wherein the major components of the valve include a stem, seal, O-ring, seat backup ring, wave spring stack, wave spring guide, snap ring, container and mainspring. The design of the valve uses a "floating" seat whereby contact between the movable valve seat and the valve seal is maintained by a light preload provided by the wave springs. When the valve is under pressure, the floating seat follows the seal until cracking pressure is reached and then the stem and seal move away from the seat which is restrained by a land in the valve container. A series of slots are placed across the end of the stem where contact is made with the container to eliminate the possibility of gas entrapment with the resultant premature opening of the valve.

Accordingly, it is an object of the invention to provide a gas relief valve design for low temperature wherein the high contact forces that normally exist between the seat and the seal are alleviated by providing a floating seat instead of a fixed seat.

Another object of the invention is to provide a gas relief valve design suitable for operation at temperatures of −65° F. and at high pressurization rates while still operating smoothly without erratic or unacceptable leakage.

Still another object of the invention is to provide a gas relief valve for use at low temperatlures and high pressurization rates wherein any leakage gas trapped between the stem and the container, which would normally reduce the pressure-generated seat/seal contact force, is allowed to dissipate so as not to upset the forces which exist to maintain a tight seal.

A further object of the invention is to provide a gas relief valve design for low temperature wherein a series of slots are placed across the end of the stem where contact is made with the container thereby eliminating the possibility of gas entrapment in the annular region formed by the metal-to-metal contact of the valve stem and container.

These and other objects, features and advantages will become more apparent after considering the following detailed description taken in conjunction with the annexed drawings and appended claims.

BRIEF DESCRIPTION OF THE DRAWINGS

FIG. 2 is a greatly enlarged view in cross section of the portion of the gas relief valve in the region of the seal showing the annular area where the gas leakage is normally trapped;

FIG. 3 is a partial end view of the gas relief valve stem showing in detail the vent slots across the end where contact is made with the container; and FIG. 4 is a cross-section view of the gas relief valve stem taken along the line 4—4 of FIG. 3 with the soft seal removed.

DESCRIPTION OF A PREFERRED EMBODIMENT

Figure 1:
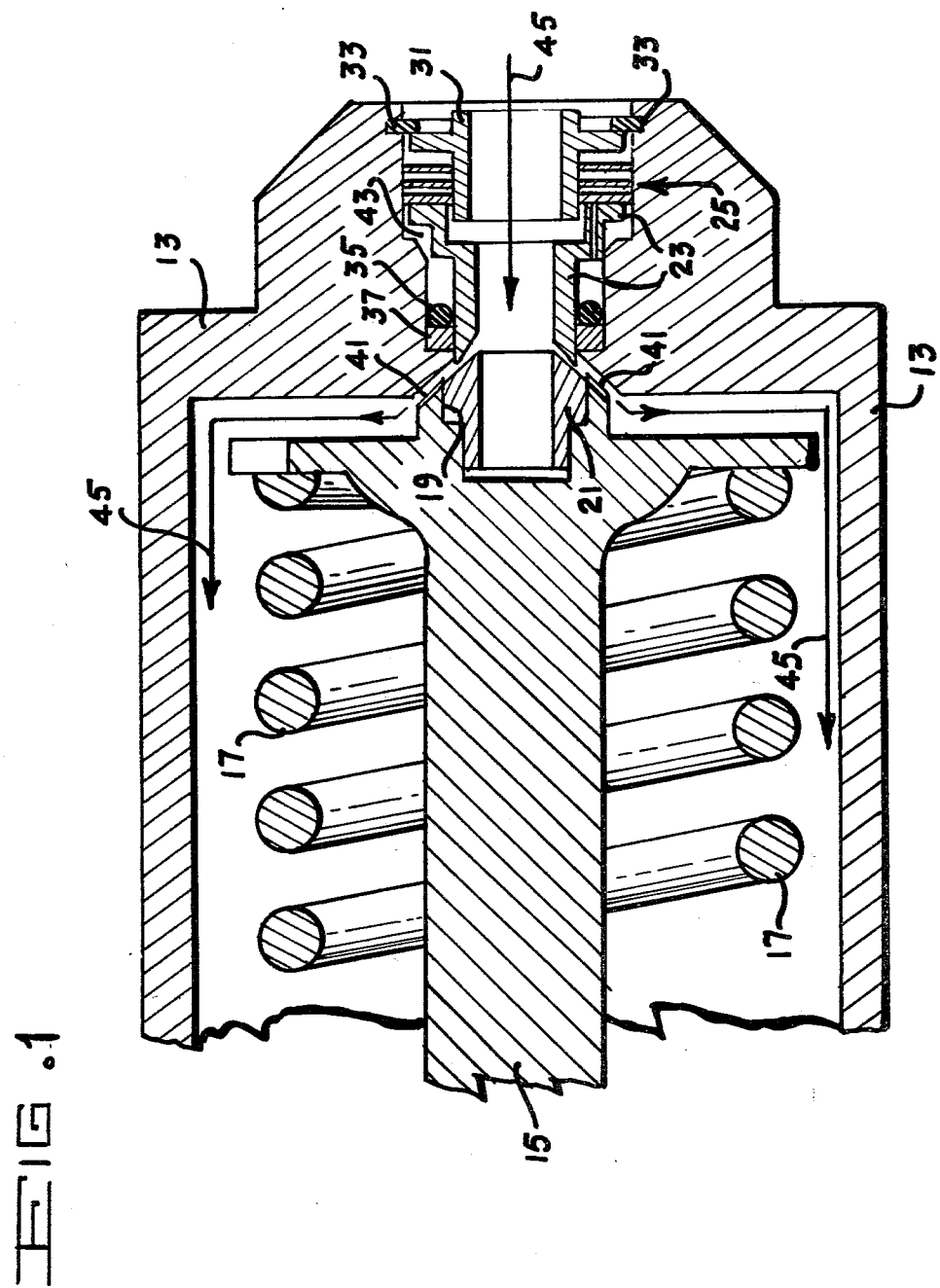
FIG. 1 is a view in longitudinal cross section of a gas relief valve construction according to the invention in position on a container.

Referring now to the Figures wherein like reference numerals refer to like elements in the several views, FIG. 1 shows the details of a relief valve which utilizes the present invention. The valve is mounted in the top portion of the container 13 and includes a stem 15 being urged to the closed position by the valve spring 17. A cavity 19 is disposed in the upper central portion of the valve stem 15 for containing a soft seal 21. In an opening in the top of the container 13, there is positioned a seat 23 slidably mounted for engagement with the soft seal 21 on the stem 15. The seat 23 is urged downward toward the seal 21 by a wave spring assembly 25 which includes spacer washers 27 and wave washers 29 (shown more clearly in FIG. 2). A wave spring guide 31 is held in place by the snap ring 33. A sealing arrangement located in the opening in the container 13 between the slidably mounted seat 33 and the inner wall of the opening includes a seat O-ring 35 of elastomeric material and a backup ring 37 of steel.

Referring now to FIG 2, there is an annular region 39 formed by the metal-to-metal contact of the stem 15 with the container 13. This region can become pressurized by any gas which leaks past the seat O-ring 35 and backup ring 37 during initial pressurization at −65° F. The leakage is caused by the thermal effects on the O-ring elastomer and lubricant, as well as the distortion of the O-ring 35 from its relaxed unpressurized condition to its final position against the backup ring 37 under full pressure load. In order to alleviate this problem of pressurization in the annular region 39, a series of slots 41 are machined or otherwise formed across the end of the stem 15 where contact is made with the container 13. In FIG. 3 which is an end view of the valve stem 15 with the soft seal 21 removed, the slots 41 are shown more clearly.

MODE OF OPERATION

With the gas relief valve in the unpressurized condition, the stem 15 is in contact with the container 13 to react the spring force from the valve's mainspring 17. The valve seat 23 is held in light contact with the seal 21 by the wave spring stack 25. When the valve is pressurized, the seat 23 and seal 21 maintain contact and translate together as an assembly as pressure builds up and compresses the valve mainspring 17. As the valve cracking pressure is reached, the seat 23 bottoms out against a land 43 in the container 13 and the stem 15 is now free to separate from the seat 23. As the seat 23 and seal 21 separate, gas, represented by the arrows 45, is allowed to vent from the valve until the pressure drops to a level where valve reseating occurs. In addition to the seat/seal contact force from the wave spring stack 25, an additional contacting force is generated from a net unbalance in pressurized areas on the valve seat. The slots 41 across the end of the stem 15, eliminate the possibility of gas entrapment in the annular region 39 (see FIG. 2) with the resultant premature opening of the valve.

Thus it can be seen that the contact force between the valve seat 23 and the seal 21 is provided by two sources; the wave spring 25 and a pressure generated force. The pressure-generated force arises from a small circular area on the seat 23 that is not subjected to inlet gas pressure. The remaining surface of the seat 23 is pressure-balanced and does not produce any contribution to seat/seal contact forces. The seat/seal contact forces are approximately 3 lbs, and up to 30 lbs for the wave spring 25 and pressure-generated sealing forces, respectively. Any leakage gas trapped between the stem 15 and container 13 reduces the pressure-generated seat/seal contact force. When the seat/seal contact force is reduced sufficiently, gas can now flow by the seat/seal interface to increase the pressure on the end of the stem 15 in contact with the container 13. This area is greater than the area of the valve seal 19 with the result that the valve opens at less than ⅔ of the design cracking pressure. The use of the slots 41 alleviates this problem by eliminating the possibility of gas entrapment in the annular region 39. Any slight gas leakage past the seat/seal interface or the seat O-ring 35 during pressurization at −65° F. is now of no concern since it cannot upset the pressure generated contact forces that must exist to maintain a tight seal and prevent escape of gas.

Although the invention has been illustrated in the accompanying drawings and described in the foregoing specification in terms of a preferred embodiment thereof, the invention is not limited to this embodiment. It will be apparent to those skilled in the art that certain changes, modification and substitutions can be made in the hereinbefore described invention, particularly with regard to the construction details, without departing from the true spirit and scope of the appended claims.

Having thus set forth the nature of our invention, what we claim and desire to secure by Letters Patent of the United States is:

1. In a gas relief valve for use in passing pressurized gas at low temperatures and high rates into a container, said gas relief valve having a spring biased valve stem with a soft seal portion on the top thereof and a slidable seal for engagement with said soft seal, said gas passing between said seat and said seal and through an annular region when the pressure is above a predetermined valve, said valve contacting said container and sealing the annular region when the pressure falls below the predetermined level, the improvement comprising a series of slots across the end of said valve stem where it makes contact with the container, said slots allowing trapped gas in the annular region to escape into said container and thereby prevent pressure from increasing in the annular region and adversely affecting the operation of the relief valve by changing the seat/seal contact force and causing the valve to operate at less than its proper design cracking pressure.

* * * * *